US005942454A

United States Patent [19]

Nakayama et al.

[11] Patent Number: 5,942,454

[45] Date of Patent: Aug. 24, 1999

[54] HIGHLY CORROSION-RESISTANT SILICON CARBIDE PRODUCT

[75] Inventors: Takahiro Nakayama; Nobuo Kageyama, both of Takasago; Atsuyoshi Takenaka, Yokohama; Yoichi Kamisuki, Takasago, all of Japan

[73] Assignee: Asahi Glass Company Ltd., Tokyo, Japan

[21] Appl. No.: 08/917,728

[22] Filed: Aug. 27, 1997

[30] Foreign Application Priority Data

Aug. 27, 1996 [JP] Japan .................................... 8-244128

[51] Int. Cl.[6] .................................................. C04B 35/569

[52] U.S. Cl. ................................ 501/88; 501/89; 156/345

[58] Field of Search ......................... 501/88, 89; 156/345

[56] References Cited

U.S. PATENT DOCUMENTS

| | | | |
|---|---|---|---|
| 4,753,763 | 6/1988 | Tanaka et al. | 264/129 |
| 5,179,049 | 1/1993 | Numata et al. | 501/88 |
| 5,318,761 | 6/1994 | Kojima et al. | 501/88 |
| 5,380,511 | 1/1995 | Arahori et al. | 501/88 |
| 5,589,116 | 12/1996 | Kojima et al. | 501/88 |
| 5,770,324 | 6/1998 | Holmes et al. | 501/88 |

FOREIGN PATENT DOCUMENTS

| | | |
|---|---|---|
| 0 486 938 | 5/1992 | European Pat. Off. . |
| 3446891 | 7/1985 | Germany . |

OTHER PUBLICATIONS

Database WPI, Week 9502, Derwent Publications Ltd., London, GB; AN 95–011633, XP002046152, & JP 06 298 515 A (Taiheiyo Random KK), Oct. 25, 1994; abstract; table 1.

Database WPI, Week 8917, Derwent Publications Ltd., London, GB; AN 89–126482, XP002046153, & JP 01 072 964 A (Shinetsu Chem. Ind. Co. Ltd.), Mar. 17, 1989, abstract; table 1,2.

*Primary Examiner*—Karl Group
*Attorney, Agent, or Firm*—Oblon, Spivak, McClelland, Maier & Neustadt, P.C.

[57] ABSTRACT

A highly corrosion-resistant silicon carbide product consisting of a sintered body having a content of α-form silicon carbide of at least 90 wt %, wherein the content of iron is at most 1 ppm, the content of aluminum is at most 5 ppm, and the content of calcium is at most 3 ppm.

5 Claims, No Drawings

HIGHLY CORROSION-RESISTANT SILICON CARBIDE PRODUCT

The present invention relates to a silicon carbide product consisting of a sintered body containing α-type silicon carbide as the main component. Particularly, it relates to a highly corrosion-resistant silicon carbide product useful for applications where corrosion resistance is required.

In recent years, a sintered body of silicon carbide is used as a constituting material for various parts for production of semiconductors, such as wafer boats, since silicon carbide can be produced to have a relatively high purity, and it has excellent heat resistance and strength.

As a powder of starting material for such a silicon carbide sintered body, JP-A-6-298515 discloses an α-form silicon carbide material wherein iron is less than 1 ppm, copper is less than 1 ppm, and aluminum is less than 1 ppm, as impurities, and a method for its production.

Further, JP-A-5-32458 discloses a high purity silicon carbide product for an apparatus for heat treatment of semiconductors, wherein the content of iron as an impurity is at most 5 ppm.

On the other hand, parts for production of semiconductors are frequently washed with a washing liquid such as hydrofluoric acid or nitric acid to prevent contamination of semiconductor wafers with impurities. Accordingly, such parts are required to have corrosion resistance so that they will not be easily corroded by such a washing liquid.

Further, U.S. Pat. No. 4,753,763 discloses a silicon carbide process tube having an iron content of 1 ppm, an aluminum content of 2 ppm and a calcium content of at most 1 ppm. However, in a such process tube, free carbon contained in an amount of 10.5% in the starting material, will react with Si in a step of impregnating Si to form β-SiC. The content of this β-SiC will be at a level of from 25 to 30 wt %, and this β-SiC deteriorates the corrosion resistance.

In a plasma etching apparatus used for producing semiconductors, a fluorine-containing gas such as $CHF_3$, $CClF_3$ or the like is used as an etching gas. Therefore, parts used for such an apparatus are required to have corrosion resistance against such a gas.

As mentioned above, JP-A-6-298515 discloses an α-form silicon carbide material wherein iron is less than 1 ppm, copper is less than 1 ppm and aluminum is less than 1 ppm, as impurities. Even if such a high purity material is used, impurities are likely to be included during molding or sintering process, whereby the purity of the finally formed silicon carbide product usually tends to be lower.

For example, molding of a silicon carbide powder usually comprises adding water and an organic binder to obtain a slurry, followed by cast molding by means of a mold made of gypsum, particularly followed by drain slip casting, and calcium is likely to be included as an impurity during such a process. Further, when the molded product is sintered in a sintering furnace, impurities in the sintering furnace are likely to be included in the sintered body to lower the purity of the sintered body.

Further, JP-A-5-32458 discloses a high purity silicon carbide product for an apparatus for heat treatment of semiconductors, wherein the content of iron as an impurity is at most 5 ppm. However, with respect to components other than iron, no purity is indicated, and it has been found that no adequate corrosion resistance can be obtained merely by adjusting the content of iron to a level of at most 5 ppm.

Accordingly, it is an object of the present invention to provide a highly corrosion-resistant silicon carbide product which is durable against washing with hydrofluoric acid, nitric acid or the like. Another object of the present invention is to provide a highly corrosion-resistant silicon carbide product which is useful for a plasma etching apparatus for producing semiconductors.

The present inventors have conducted a research for many years on a silicon carbide sintered body suitable as a material for parts for production of semiconductors, and in the course of the research, they have succeeded in producing a high purity silicon carbide sintered body which has never been available heretofore and they have found that such a sintered body has excellent corrosion resistance. The present invention has been accomplished on the basis of these discoveries.

Namely, in the first aspect, the present invention provides a highly corrosion-resistant silicon carbide product consisting of a sintered body having a content of α-form silicon carbide of at least 90 wt %, wherein the content of iron is at most 1 ppm, the content of aluminum is at most 5 ppm, and the content of calcium is at most 3 ppm.

In the second aspect, the present invention provides a highly corrosion-resistant silicon carbide product useful at a site which is in contact with a dry etching gas such as a fluorine-containing hydrocarbon gas, consisting of a sintered body having a content of α-form silicon carbide of at least 50 wt %, wherein the content of iron is at most 1 ppm, the content of aluminum is at most 5 ppm, and the content of calcium is at most 3 ppm.

In the third aspect, the present invention provides a plasma etching apparatus for producing semiconductors, using a highly corrosion-resistant silicon carbide product wherein the content of iron is at most 1 ppm, the content of aluminum is at most 5 ppm, the content of calcium is at most 3 ppm, and the content of α-form silicon carbide is at least 50 wt %.

According to the first aspect of the present invention, it is possible to obtain excellent corrosion resistance against a washing liquid such as hydrofluoric acid or nitric acid. The reason for such excellent corrosion resistance is not clearly understood. However, it is considered that the product may be hardly corroded firstly because the content of α-form silicon carbide in the product is at least 90 wt %, and the content of β-form silicon carbide which is inferior in corrosion resistance is less than 10 wt %, and secondly because lattice defects formed by iron, aluminum and calcium as impurities will be less. If the content of iron exceeds 1 ppm, the content of aluminum exceeds 5 ppm, or the content of calcium exceeds 3 ppm, the above mentioned corrosion resistance tends to remarkably decrease. Preferably, the content of iron is at most 0.7 ppm, the content of aluminum is at most 3 ppm, and the content of calcium is at most 3 ppm.

According to the second aspect of the present invention, it is possible to obtain a product excellent in corrosion resistance against a fluorine-containing gas such as $CHF_3$ or $CClF_3$.

According to the third aspect of the present invention, semiconductors can be produced constantly for a long period of time, since a material excellent in corrosion resistance to a fluorine-containing gas is used.

The silicon carbide product may, for example, be an electrode, a gas-dispersing plate, a suscepter, a guide ring or a chamber sleeve, of a plasma etching apparatus.

The silicon carbide powder to be used as a starting material for producing the silicon carbide product of the present invention is preferably one having a high purity wherein iron is at most 1 ppm, aluminum is at most 10 ppm, preferably at most 6 ppm and calcium is at most 3 ppm. As such a high purity silicon carbide powder, α-form silicon carbide prepared by the method disclosed in JP-A-6-298515, may, for example, preferably be employed. This method comprises filling a carbonatious material and metal silicon in a silicon carbide crucible, heating them under a vacuumed condition of at most 0.2 mmHg, and then maintaining them in an inert gas atmosphere at a temperature of from 2000 to 2200° C. to synthesize α-form silicon carbide.

Otherwise, as the starting material, silicon carbide type powder, β-form silicon carbide synthesized by a gas phase synthesis or by a reaction of silica with carbon, may also be used. β-form silicon carbide is more readily prepared in a high purity than α-form silicon carbide, and accordingly, a starting material having the above mentioned purity can relatively easily be obtained. When β-form silicon carbide is used as the starting material, it can be converted to α-form silicon carbide by adjusting the temperature for sintering to a level of at least 2100° C.

In a case where the purity of the starting material silicon carbide powder is not within the above mentioned range, the purity can be increased by washing the starting material powder with a mixed acid comprising hydrofluoric acid and nitric acid, and pure water to dissolve impurities in the powder.

The silicon carbide powder thus prepared is mixed with water and an organic binder to obtain a slurry, and this slurry is cast in a resin mold, extruded by rolling or subjected to filter press or hydrostatic press to obtain a green product having a suitable shape depending upon the particular purpose. As the organic binder, a phenol resin, a polyvinyl acetate emulsion, an acrylic resin emulsion, a butyral resin, methylcellulose or wax may, for example, be preferably used. For this molding, it is important not to use a gypsum mold as in a conventional common method in order to avoid inclusion of calcium. However, a gypsum mold may be used if a coating film is formed on its surface to prevent contamination with impurities.

The green product thus obtained, is subjected to green processing (shaping in the state of a green product) as the case requires and sintered in an inert atmosphere in a sintering furnace. Here, in order to avoid contamination of impurities from the sintering furnace, it is advisable to preliminarily subject the sintering furnace to vacuum sintering (empty sintering) at a temperature of at least 2000° C. The sintering temperature of the molded product is at least 1600° C., preferably from 1600 to 2200° C. However, in a case where a β-form silicon carbide powder is used as a starting material, as mentioned above, it is necessary to set the sintering temperature to a level of at least 2100° C. to convert it to α-form silicon carbide.

In the present invention, the sintered body as described above may be subjected to finish processing and may be used as it is for various parts. However, in a case where mechanical strength is particularly required, silicon may be impregnated to the obtained sintered body. Impregnation of silicon can be carried out by contacting molten silicon of a high purity to the surface of the sintered body at a temperature of from 1500 to 1800° C. to let it penetrate into the surface.

Further, a coating film of silicon carbide may be formed by CVD on the surface of the sintered body having silicon impregnated as described above.

The silicon carbide product of the present invention is a silicon carbide product produced by the method as described above, wherein the content of iron is at most 1 ppm, the content of aluminum is at most 5 ppm, and the content of calcium is at most 3 ppm, as impurities.

This silicon carbide product has excellent corrosion resistance and is useful for parts for production of semiconductors, for which high corrosion resistance is required, such as an electrode for plasma etching, a gas dispersing plate for a plasma etching apparatus, a filter for a semiconductor-process gas, a holder for washing semiconductor parts, a filter for a cleaning liquid for semiconductor parts, and a wafer boat.

Now, the present invention will be described in further detail with reference to Examples. However, it should by understood that the present invention is by no means restricted to such specific Examples.

EXAMPLE 1

Using an α-form silicon carbide powder having a content of iron of 0.2 ppm, a content of aluminum of 0.8 ppm and a content of calcium of 0.5 ppm, as the starting material, and a polyvinyl alcohol as a binder, a green product was formed by filter press and sintered at 1500° C. to obtain a silicon carbide product consisting of a sintered body having a pore size of 0.3 μm and having a content of iron of 0.3 ppm, a content of aluminum of 1.7 ppm and a content of calcium of 0.6 ppm. This product had a content of α-form silicon carbide of 100 wt %.

This silicon carbide product was immersed into a 50% hydrofluoric acid aqueous solution at 40° C. for 72 hours and then taken out, and the weight reduction as compared with the initial weight was measured and found to be 0.005%. Further, it was immersed in a 1:1 mixed acid of hydrofluoric acid and nitric acid, treated in a pressure container at 190° C. for 68 hours and then taken out, and the weight reduction was measured in the same manner as above and found to be 0.31%.

Using this silicon carbide product, a filter for cleaning liquid for semiconductor parts, was prepared and tested, whereby it showed excellent durability.

EXAMPLE 2

Using an α-form silicon carbide powder having a content of iron of 0.2 ppm, a content of aluminum of 0.8 ppm and a content of calcium of 0.5 ppm, as the starting material, and an acrylic emulsion as a binder, a green product was formed by casting in a resin mold, and sintered at 1800° C. to obtain a sintered product having a pore size of 1.1 μm. Silicon impregnation was applied to this sintered body to obtain a silicon carbide product having a content of iron of 0.2 ppm, a content of aluminum of 1.2 ppm and a content of calcium of 0.5 ppm. This product had a content of α-form silicon carbide of 100 wt %.

This silicon carbide product was immersed in a 50% hydrofluoric acid aqueous solution at 40° C. for 72 hours and then taken out, and the weight reduction as compared with the initial weight, was measured and found to be 0.003%. Further, it was immersed in a 1:1 mixed acid of hydrofluoric acid and nitric acid, treated in a pressure container at 190° C. for 68 hours and then taken out, and the weight reduction was measured in the same manner as above and found to be 27%. However, dissolved was silicon only.

Using this silicon carbide product, a wafer jig to be used for washing a semiconductor wafer with hydrofluoric acid, was prepared and tested, whereby it showed excellent durability.

EXAMPLE 3

Using an α-form silicon carbide powder prepared by a gas phase method and having a content of iron of 0.5 ppm, a content of aluminum of 0.3 ppm and a content of calcium of 0.3 ppm, as the starting material, and an acrylic emulsion as a binder, a green product was formed by casting in a resin mold, and it was sintered at 2200° C. to obtain a silicon carbide product consisting of a sintered body converted to α-form silicon carbide and having a pore size of 3.5 μm, a content of iron of 0.6 ppm, a content of aluminum of 0.4 ppm and a content of calcium of 0.2 ppm. This material had a content of α-form silicon carbide of 95 wt %.

This silicon carbide product was immersed in a 50% hydrofluoric acid aqueous solution at 40° C. for 72 hours and then taken out, and the weight reduction as compared with the initial weight, was measured and found to be 0.004%. Further, it was immersed in a 1:1 mixed acid of hydrofluoric acid and nitric acid, treated in a pressure container at 190° C. for 68 hours and then taken out, and the weight reduction was measured in the same manner as above and found to be 0.14%.

Using this silicon carbide product, a gas dispersing plate for a plasma etching apparatus was prepared and tested, whereby it showed excellent durability.

EXAMPLE 4

Using a β-form silicon carbide powder prepared by a silica-reduction method and having a content of iron of 0.8 ppm, a content of aluminum of 3.5 ppm and a content of calcium of 1.1 ppm, as the starting material, and a polyvinyl alcohol as a binder, a green product was formed by filter press and sintered at 2100° C. to obtain a sintered body converted to α-form silicon carbide having a pore size of 2.0 μm. Silicon was impregnated to this sintered body to obtain a silicon carbide product having a content of iron of 0.9 ppm, a content of aluminum of 2.1 ppm and a content of calcium of 1.6 ppm. This product had a content of α-form silicon carbide of 90 wt %.

This silicon carbide product was immersed in a 50% hydrofluoric acid aqueous solution at 40° C. for 72 hours and then taken out, and the weight reduction as compared with the initial weight, was measured and found to be 0.015%. Further, it was immersed in a 1:1 mixed acid of hydrofluoric acid and nitric acid, treated in a pressure container at 190° C. for 68 hours and then taken out, and the weight reduction was measured in the same manner as above and found to be 43%. However, dissolved was silicon only.

Using this silicon carbide product, a suscepter was prepared. A silicon wafer was mounted on this suscepter, and a $SiO_2$ film was formed on this silicon wafer by CVD, and then the suscepter was washed with an acid. This film-forming-washing was repeated 1000 times for testing, whereby excellent durability was shown.

COMPARATIVE EXAMPLE 1

Using an α-form silicon carbide powder having a content of iron of 1.8 ppm, a content of aluminum of 14 ppm and a content of calcium of 3.2 ppm, as the starting material, and a polyvinyl alcohol as a binder, a green product was formed by filter press and sintered at 1900° C., to obtain a silicon carbide product consisting of a sintered body having a pore diameter of 1.5 μm and having a content of iron of 2.1 ppm, a content of aluminum of 18 ppm and a content of calcium of 3.7 ppm. This product had a content of α-form silicon carbide of 100 wt %.

This silicon carbide product was immersed in a 50% hydrofluoric acid aqueous solution at 40° C. for 72 hours and then taken out, and the weight reduction as compared with the initial weight, was measured and found to be 0.08%. Further, it was immersed in a 1:1 mixed acid of hydrofluoric acid and nitric acid, treated in a pressure container at 190° C. for 68 hours and then taken out, and the weight reduction was measured in the same manner as above and found to be 33%.

COMPARATIVE EXAMPLE 2

Using a β-form silicon carbide powder prepared by a gas phase method and having a content of iron of 0.5 ppm, a content of aluminum of 0.3 ppm and a content of calcium of 0.3 ppm as the starting material, and a polyvinyl alcohol as a binder, a green product was formed by filter press and sintered at 1700° C., to obtain a silicon carbide product consisting of a sintered body of β-form silicon carbide having a pore size of 0.8 pm and having a content of iron of 0.7 ppm, a content of aluminum of 0.5 ppm and a content of calcium of 1.2 ppm. This product had a content of α-form silicon carbide of 10 wt %.

This silicon carbide product was immersed in a 50% hydrofluoric acid aqueous solution at 40° C. for 72 hours and then taken out, and the weight reduction as compared with the initial weight, was measured and found to be 1.42%. Further, it was immersed in a 1:1 mixed acid of hydrofluoric acid and nitric acid, treated in a pressure container at 190° C. for 68 hours and then taken out, and the weight reduction was measured in the same manner as above and found to be 99%.

The results of the foregoing Examples 1 to 4 and Comparative Examples 1 and 2 are summarized in Table 1.

TABLE 1

| Conditions | Example 1 | Example 2 | Example 3 | Example 4 | Comparative Example 1 | Comparative Example 2 | Comparative Example 2 |
|---|---|---|---|---|---|---|---|
| Starting material | Synthetic α-SiC | Synthetic α-SiC | Gas phase method β-SiC | Silica reduction method β-SiC | Acheson method α-SiC | Gas phase method β-SiC | Acheson method α-SiC |
| Fe | 0.2 ppm | ← | 0.5 ppm | 0.8 ppm | 1.8 ppm | 0.5 ppm | 8 ppm |
| Al | 0.8 ppm | ← | 0.3 ppm | 3.5 ppm | 14 ppm | 0.3 ppm | 7 ppm |
| Ca | 0.5 ppm | ← | 0.3 ppm | 1.1 ppm | 3.2 ppm | 0.3 ppm | 13 ppm |
| Binder | PVA | Acrylic emulsion | ← | PVA | ← | ← | Phenol resin |
| Molding | Filter press | Casting in a resin mold | ← | Filter press | ← | ← | Hydrostatic press |
| Sintering temp. | 1500° C. | 1800° C. | 2200° C. | 2100° C. | 1900° C. | 1700° C. | 1800° C. |
| Pore diameter | 0.3 μm | 1.1 μm | 3.5 μm | 2.0 μm | 1.5 μm | 0.8 μm | |

TABLE 1-continued

| Conditions | Example 1 | Example 2 | Example 3 | Example 4 | Comparative Example 1 | Comparative Example 2 | Comparative Example 2 |
|---|---|---|---|---|---|---|---|
| Constituting phases | α-SiC 100 wt % | α-SiC 100 wt % | α-SiC 95 wt % | α-SiC 90 wt % | α-SiC 100 wt % | β-SiC 100 wt % | α-SiC 75 wt % |
| Impregnation | No | Yes | No | Yes | No | No | Yes |
| Fe | 0.3 ppm | 0.2 ppm | 0.6 ppm | 0.9 ppm | 2.1 ppm | 0.7 ppm | 1.0 ppm |
| Al | 1.7 ppm | 1.2 ppm | 0.4 ppm | 2.1 ppm | 18 ppm | 0.5 ppm | 2.3 ppm |
| Ca | 0.6 ppm | 0.5 ppm | 0.2 ppm | 1.6 ppm | 3.7 ppm | 1.2 ppm | 0.9 ppm |
| HF 50% 40° C. 72 h Weight reduction | 0.005% | 0.003% | 0.004% | 0.015% | 0.08% | 1.42% | 0.115% |
| $HF + HNO_3$ 190° C. 68 h Weight reduction | 0.31% | 27% Si only | 0.14% | 43% Si only | 33% | 99% | 25% Si only |

COMPARATIVE EXAMPLE 3

Using an α-form silicon carbide powder prepared by an Acheson method was washed with a mixed acid of hydrofluoric acid and nitric acid to obtain a starting material powder. The contents of iron, aluminum and calcium in this starting material powder were 8 ppm, 7 ppm and 13 ppm, respectively. Then, using this starting material powder and a phenol resin as a binder, a green product was formed by hydrostatic press and sintered at 1800° C. with flowing HCl gas to obtain a sintered body of α-form silicon carbide. The contents of α-form silicon carbide, iron, aluminum and calcium in this sintered body are shown in Table 1.

Then, with this sintered body, the weight reduction when immersed in hydrofluoric acid or in a mixed acid of hydrofluoric acid and nitric acid, was measured in the same manner as in Example 1. The results are shown in Table 1.

EXAMPLE 5

Using a β-form silicon carbide powder prepared by a silica-reduction method as the starting material (the contents of iron, aluminum and calcium are as shown in Table 2), a green product was formed by a roll out method. Then, the green product was sintered at a temperature as identified in Table 2 to obtain a sintered body of an α-form silicon carbide product (size: 60 mm×60 mm×1 t). The contents of α-form silicon carbide, iron, aluminum and calcium in this sintered body were as shown in Table 2.

Then, with respect to this sintered body, corrosion resistance against $CClF_3$ gas or $CHF_3$ gas was measured as follows, and the results are shown in Table 2.

Corrosion resistance against $CClF_3$ gas

The above sintered body was placed in a plasma etching apparatus and maintained for two hours under an etching condition for polysilicon while introducing $CClF_3$ gas. This operation was repeated ten times, whereby the weight reduction of the sintered body was measured and taken as the corrosion resistance.

Corrosion resistance against $CHF_3$ gas

The above sintered body was placed in a plasma etching apparatus and maintained for one hour under an etching condition for $SiO_2$. This operation was repeated ten times, whereby the appearance of the sintered body was visually inspected, and the weight reduction was measured, and they were taken as the corrosion resistance.

Separately, a green product was formed by a roll out method in the same manner as above, and a disk of 320 mm in diameter×5 t was punched out. Then, this disk was sintered to obtain a disk-shaped sintered body of an α-form silicon carbide product.

This product was used as a suscepter of a plasma etcher whereby it showed a useful life longer by 1.5 times than conventional suscepters.

EXAMPLE 6

Using an α-form silicon carbide powder starting material (the contents of iron, aluminum and calcium are as shown in Table 2) obtained by a synthetic method, a sintered body of an α-form silicon carbide product was prepared in the same manner as in Example 5 (the binder and the sintering temperature are as shown in Table 2).

This sintered body had a content of α-form silicon carbide of 100 wt %.

With respect to this sintered body, corrosion resistance against $CClF_3$ gas or $CCHF_3$ gas was measured in the same manner as in Example 5, and the results are shown in Table 2.

Separately, in the same manner as in Example 5, the sintered body was used as a suscepter of a plasma etcher, whereby it showed the same useful life as in Example 5.

EXAMPLE 7

Using a β-form silicon carbide powder (the contents of iron, aluminum and calcium are as identified in Table 2) obtained by a gas phase method, a green product was formed by a roll out method and sintered to obtain a sintered product of an α-form silicon carbide product. The binder and the sintering temperature thereby used are shown in Table 2.

Then, silicon was impregnated to this sintered body, and corrosion resistance was measured in the same manner as in Example 5. The contents of α-form silicon carbide, iron, aluminum and calcium in this impregnated body are also shown in Table 2. The results are shown in Table 2.

EXAMPLE 8

Using an α-form silicon carbide powder starting material (the contents of iron, aluminum and calcium are as shown in Table 2) obtained by a synthetic method, a green product was formed by a hydrostatic press and sintered to obtain a sintered body of an α-form silicon carbide product. The binder and the sintering temperature thereby used are shown in Table 2.

Then, silicon was impregnated to this sintered body, and corrosion resistance was measured in the same manner as in Example 5. The contents of α-form silicon carbide, iron, aluminum and calcium in this impregnated body are also shown in Table 2. The results are shown in Table 2.

EXAMPLE 9

An α-form silicon carbide powder obtained by an Acheson method was washed with a mixed acid of hydrofluoric acid and nitric acid to obtain a starting material powder. Using this starting material powder (the contents of iron, aluminum and calcium are as shown in Table 2), a green product was formed by a hydrostatic press and sintered to obtain a sintered product of an α-form silicon carbide product.

The binder and the sintering temperature thereby used are shown in Table 2.

The contents of α-form silicon carbide, iron, aluminum and calcium in this sintered body are also shown in Table 2.

Then, with respect to this sintered body, corrosion resistance was measured in the same manner as in Example 5, and the results are shown in Table 2.

EXAMPLE 10

Using an α-form silicon carbide powder starting material (the contents of iron, aluminum and calcium are as shown in Table 2) obtained by a synthetic method, a green product was formed by casting in a resin mold and sintered to obtain a sintered body of an α-form silicon carbide product.

The binder and the sintering temperature thereby used are shown in Table 2.

The contents of α-form silicon carbide, iron, aluminum and calcium in this sintered body are also shown in Table 2.

Then, with respect to this sintered body, corrosion resistance was measured in the same manner as in Example 5, and the results are shown in Table 2.

COMPARATIVE EXAMPLE 4

Using an α-form silicon carbide powder starting material (the contents of iron, aluminum and calcium are as shown in Table 2) obtained by a synthetic method, a green product was formed by a roll out method and sintered to obtain a sintered body of an α-form silicon carbide product.

The binder and the sintering temperature thereby used are shown in Table 2.

Then, silicon was impregnated to this sintered body, and corrosion resistance was measured in the same manner as in Example 5. The contents of α-form silicon carbide, iron, aluminum and calcium in this impregnated body are also shown in Table 2. The results are shown in Table 2.

COMPARATIVE EXAMPLE 5

Using a β-form silicon carbide powder starting material (the contents of iron, aluminum and calcium are as shown in Table 2) obtained by a silica reduction method, a green product was formed by a hydrostatic press and sintered to obtain a sintered body of an α-form silicon carbide product.

The binder and the sintering temperature thereby used are shown in Table 2.

The contents of α-form silicon carbide, iron, aluminum and calcium in this sintered body are also shown in Table 2.

Then, with respect to this sintered body, corrosion resistance was measured in the same manner as in Example 5, and the results are shown in Table 2.

COMPARATIVE EXAMPLE 6

Using an α-form silicon carbide powder starting material (the contents of iron, aluminum and calcium are as shown in Table 2) obtained by an Acheson method, a green product was formed by a hydrostatic press and sintered to obtain a sintered product of an α-form silicon carbide product.

The binder and the sintering temperature thereby used are shown in Table 2.

The contents of α-form silicon carbide, iron, aluminum and calcium in this sintered body are also shown in Table 2.

Then, with respect to this sintered body, corrosion resistance was measured in the same manner as in Example 5, and the results are shown in Table 2.

COMPARATIVE EXAMPLE 7

Using an α-form silicon carbide powder starting material (the contents of iron, aluminum and calcium are as shown in Table 2) obtained by an Acheson method, a green product was formed by casting in a resin mold and sintered to obtain a sintered product of an α-form silicon carbide product.

The binder and the sintering temperature thereby used are shown in Table 2.

The contents of α-form silicon carbide, iron, aluminum and calcium in this sintered body are also shown in Table 2.

Then, with respect to this sintered body, corrosion resistance was measured in the same manner as in Example 5, and the results are shown in Table 2.

As described in the foregoing, the present invention provides a silicon carbide product excellent in corrosion resistance against hydrofluoric acid and nitric acid. It is particularly excellent in corrosion resistance against a fluorine-containing gas such as $CHF_3$ or $CClF_3$, and it is useful for parts of a plasma etching apparatus for producing semiconductors.

TABLE 2

| Conditions | Example 5 | Example 6 | Example 7 | Example 8 | Example 9 | Example 10 |
|---|---|---|---|---|---|---|
| Starting material | Silica reduction method β-SiC | Synthetic α-SiC | Gas phase method β-SiC | Synthetic α-SiC | Acheson method + washing α-SiC | Synthetic α-SiC |
| Fe | 1.2 ppm | 0.2 ppm | 0.4 ppm | 0.2 ppm | 4 ppm | 0.2 ppm |
| Al | 0.5 ppm | 0.4 ppm | 0.5 ppm | 0.8 ppm | 5 ppm | 0.4 ppm |
| Ca | 1.4 ppm | 0.9 ppm | 1.2 ppm | 0.5 ppm | 7 ppm | 0.9 ppm |
| Binder | Methyl cellulose | Butyral resin | Wax | Acrylic resin | Wax | PVA |
| Molding | Roll out | Roll out | Roll out | Hydrostatic press | Hydrostatic press | Casting in a resin mold |
| Sintering temp. | 2250° C. | 1650° C. | 2100° C. | 1850° C. | 2150° C. | 2000° C. |
| Constituting phases | α-SiC 95 wt % β-SiC 5 wt % | α-SiC 100 wt % | α-SiC 60 wt % β-SiC 40 wt % | α-SiC 100 wt % | α-SiC 100 wt % | α-SiC 100 wt % |
| Impregnation | No | No | Yes | Yes | No | No |
| Fe | 0.8 ppm | 0.6 ppm | 0.8 ppm | 0.3 ppm | 0.4 ppm | 0.1 ppm |
| Al | 1.4 ppm | 0.9 ppm | 3.9 ppm | 1.9 ppm | 4.5 ppm | 2.2 ppm |
| Ca | 0.3 ppm | 0.9 ppm | 2.6 ppm | 1.4 ppm | 2.5 ppm | 1.7 ppm |
| Weight reduction in $CClF_3$ gas | 0.020% | 0.010% | 0.075% | 0.050% | 0.060% | 0.020% |
| Weight reduction in $CHF_3$ gas | 0.009% | 0.009% | 0.034% | 0.008% | 0.011% | 0.006% |
| Appearance after etching | Slight fogging | No change | Slight fogging | No change | No change | No change |

| Conditions | Comparative Example 4 | Comparative Example 5 | Comparative Example 6 | Comparative Example 7 |
|---|---|---|---|---|
| Starting material | Synthetic α-SiC | Silica reduction method β-SiC | Acheson method + washing α-SiC | Acheson method + washing α-SiC |
| Fe | 0.2 ppm | 1.2 ppm | 8 ppm | 8 ppm |
| Al | 0.8 ppm | 0.5 ppm | 7 ppm | 7 ppm |
| Ca | 0.5 ppm | 1.4 ppm | 13 ppm | 13 ppm |
| Binder | Butyral resin | Phenol resin | Phenol resin | Phenol resin |
| Molding | Roll out | Hydrostatic press | Hydrostatic press | Casting in a resin mold |
| Sintering temp. | 1400° C. | 2000° C. | 1500° C. and HCl gas treatment | 1800° C. and HCl gas treatment |
| Constituting phases | α-SiC 95 wt % β-SiC 5 wt % | α-SiC 8 wt % β-SiC 92 wt % | α-SiC 95 wt % free carbon 5% | α-SiC 90 wt % free carbon 10% |
| Impregnation | Yes | No | No | No |
| Fe | 1.5 ppm | 6 ppm | 0.8 ppm | 1.5 ppm |
| Al | 0.8 ppm | 3 ppm | 13 ppm | 3 ppm |
| Ca | 3.2 ppm | 0.5 ppm | 0.9 ppm | 2 ppm |
| Weight reduction in $CClF_3$ gas | 0.025% | 0.280% | 0.180% | 0.140% |
| Weight reduction in $CHF_3$ gas | 0.060% | 0.120% | 0.052% | 0.080% |

TABLE 2-continued

| | | | | |
|---|---|---|---|---|
| Appearance after etching | Fine cracking | Powder forming | Fine cracking | Color shading |

What is claimed is:

1. A plasma etching apparatus for producing semiconductors, wherein at least one of the components of the apparatus is made from a corrosion resistant silicon carbide product having at most 1 ppm iron, at most 5 ppm aluminum, at most 3 ppm calcium, and at least 50 wt % a silicon carbide.

2. The plasma etching apparatus for producing semiconductors according to claim 1, wherein the content of α-form silicon carbide in said component is at least 70 wt %.

3. The plasma etching apparatus for producing semiconductors according to claim 1, wherein the content of α-form silicon carbide in said component is at least 90 wt %.

4. The plasma etching apparatus for producing semiconductors according to claim 1, wherein the content of iron in said component is at most 0.7 ppm, the content of aluminum is at most 3 ppm, and the content of calcium is at most 3 ppm.

5. The plasma etching apparatus for producing semiconductors according to claim 3, wherein the content of iron in said component is at most 0.7 ppm, the content of aluminum is at most 3 ppm, and the content of calcium is at most 3 ppm.

* * * * *